Dec. 19, 1950 — C. K. BROWN, JR — 2,534,658
MIXING AND VOLUME CONTROL FAUCET
Filed July 25, 1946 — 3 Sheets-Sheet 1

Inventor
CHARLES KEPLER BROWN, JR

By Howard J. Whelan
Attorney

Inventor
CHARLES KEPLER BROWN, JR.
By Howard J. Whelan.
Attorney

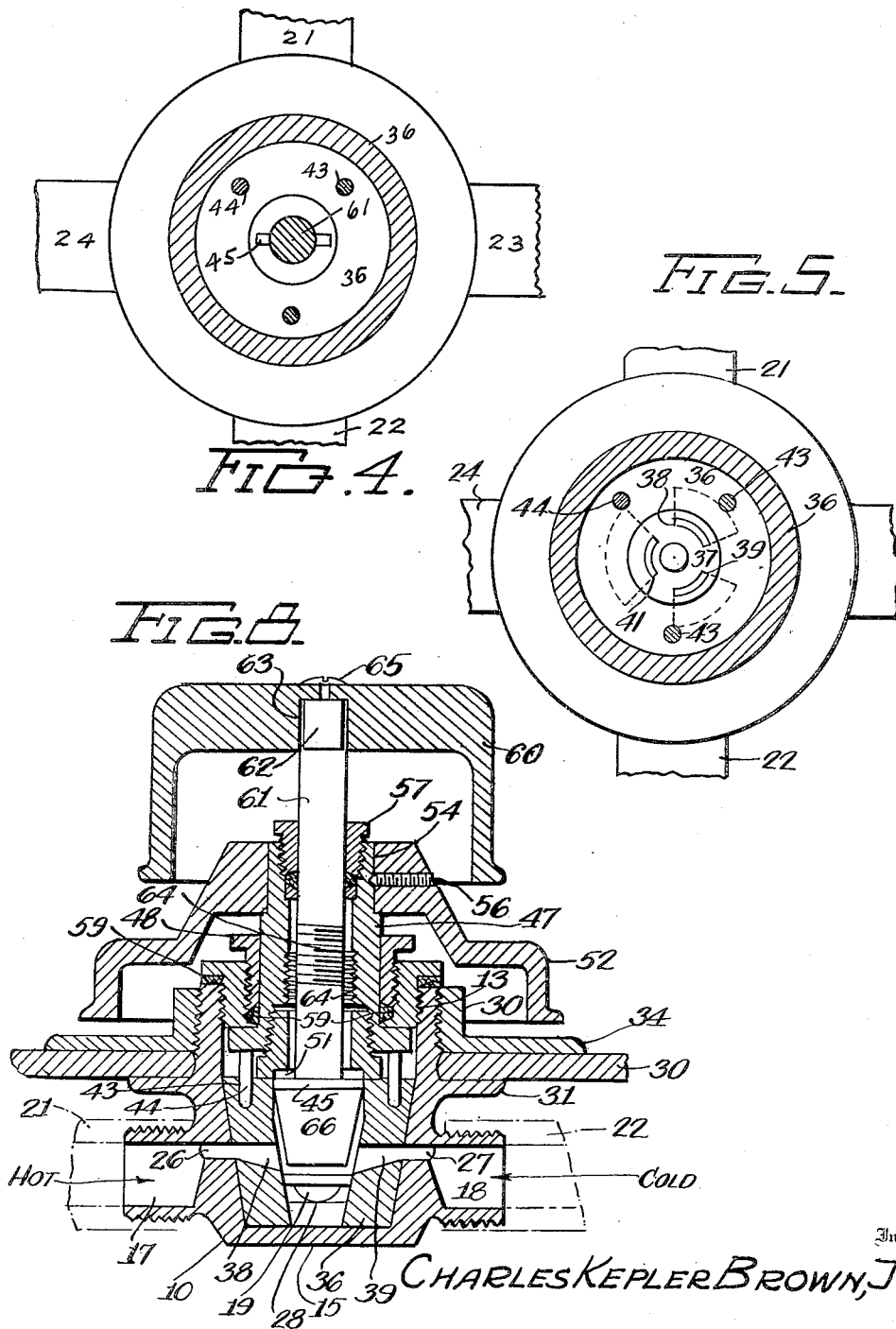

Patented Dec. 19, 1950

2,534,658

UNITED STATES PATENT OFFICE 2,534,658

MIXING AND VOLUME CONTROL FAUCET

Charles Kepler Brown, Jr., Fairmont, W. Va.

Application July 25, 1946, Serial No. 686,219

2 Claims. (Cl. 277—11)

This invention relates to plumbing equipment and more particularly to faucets for use in this class of apparatus.

There are a number of particular forms of faucets usable for mixing hot and cold water within a combination unit. They are however limited to a single-use faucet, which is either for a sink or basin accessory alone or for a shower control alone.

In this invention, it is an object to provide a new and improved form of mixing faucet that will avoid one or more of the disadvantages and limitations of the prior art.

Another object of this invention is to provide a new and improved form of hot and cold water mixing faucet that will be capable of use for sink, basin or bath pouring and at the same time be available for an alternate use for shower or similar arrangements, from the same faucet unit.

An additional object of the present invention is to provide a new and improved mixing faucet that can be used for mixing liquids of plural characteristics in a single structure and then direct the combined fluids to alternate dispensing outlets arbitrarily.

Another object of the present invention is to provide a new and improved faucet which is provided with means for adjusting the tapered plug in the body member.

Other objects will become apparent as the invention is more fully set forth.

For a clearer understanding of the present invention, reference is made to the appended drawings and the attached description of a particular form, furnished by way of example to illustrate the general principles of the invention, while the claims indicate the scope and spirit of the same.

In the drawings:

Figure 4 is a plan view taken along line 4—4 of Figure 3, showing the tapered plug and valve head positioned in the casing;

Figure 5 is a view similar to that shown in Figure 4 but with the valve head removed to show the position of the inlets in the tapered plug;

Figure 8 is a sectional view similar to that shown in Figure 2, but with the valve head raised to allow the mixed fluids to leave through the shower pipe.

Similar reference characters refer to similar characters throughout the drawings.

Figure 1:
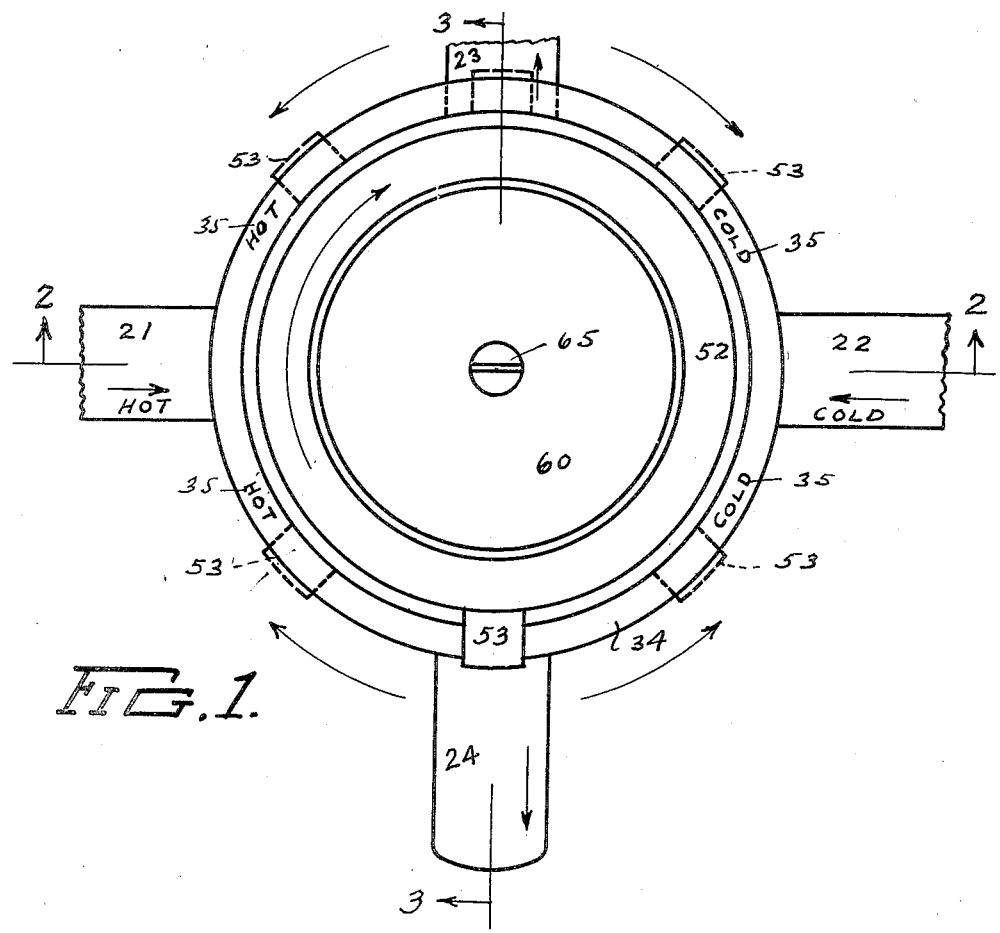
Figure 1 is a plan view of a mixing faucet unit embodying this invention.
Figures 6, 7:
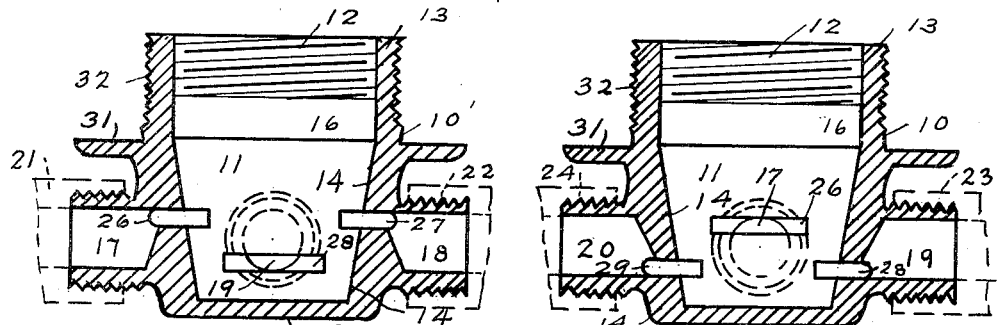
Figure 6 is a sectional view of the body member similar to Figure 2 but with the various parts removed to show its inner construction.
Figure 7 is a sectional view of the body member similar to Figure 3 but with various parts removed to show its inner construction.

In the structure indicated in the drawings, a body member 10 is formed with a hollowed out interior chamber 11 and open at the upper end. The upper wall surface 13 of this chamber 11 is screw threaded at 12 while the lower wall 14 is frustrumatically tapered. The bottom 15 is flat and an intervening vertical surface 16 is straight. There are four screw connections, 17, 18, 19 and 20 respectively for outside coupling of a hot water pipe 21, a cold water pipe 22, shower piping 23, and a spigot spout 24 respectively. Peripheral grooved slots 26, 27, 28 and 29, respectively enable the water to pass through same into the different channels in their proper sequence. The member 10 has a flange 31 formed to facilitate the attachment of the unit to a basin 30 or other utensil to which it is to be attached. The exterior of the upper wall of the member 10 is screw threaded at 32 to take and receive an interiorly screw threaded clamp plate 33 with a circular flange 34 alignable with the flange 31 and serving to engage the upper surface of the basin that the unit is clamped to. The body member 10 is arranged to pass through a hole in the basin 30 to position itself for use therefor. A tapered plug 36 is inserted into the chamber 11 and rotatably fits therein. It has a central hole 37 that is internally tapered towards the bottom and leading to passages 38, 39 and 41 spaced circumferentially therein with passages 38 and 39 on the same level and 41 situated on a different level. They however can align when the plug is rotated with the passages 26, 27, 28 and 29 in the member 10, in predetermined sequence. An upper portion 42 of the hole 37 has its surrounding surface straight and vertical. Holes 43 of limited depth are spaced apart on the same diameter circle, at such distances as may be selected. This plug fits in the lower tapered portion of the member 10 and is operably revolved by pins 44 projecting from the flat surface of the flange 46 of a spindle 47. The spindle 47 is kept in place by a flanged nut 50 having a packing nut 48 with a relatively large central passage 49. The packing nut is screw threaded on its external portion and is screwed into the flanged nut 50. The nut 50 is externally screw-threaded to fit the screw threaded portion 12. A gasket 59 at this point prevents leakage. A revolving cap 52 is of the form indicated in the drawings with a step-shaped exterior and internal contour to enable it to appropriately cover the parts of the structure and keep it in a practical and concise form. An indicator manipulating arm 53 is included in the design of the cap 52 and is intended for registry with suitable marks 35 provided on the plate 34 so that the operator may appreciate what temperature water is being discharged, and the position of the arm also determines the direction of water flow. To facilitate this positioning the opening 54 in the cap is made irregular in outline to fit over the upper portion 55 of the spindle 47 to form a key-like manipulator for the latter. A set screw 56 ties the cap to this spindle additionally to prevent its unauthorized removal during use. A stuffing box nut 57 screws into the central passage of the spindle and presses on packing 58 to prevent leakage therethrough. Packing 59 at other locations is used for the same purpose.

Figure 2:
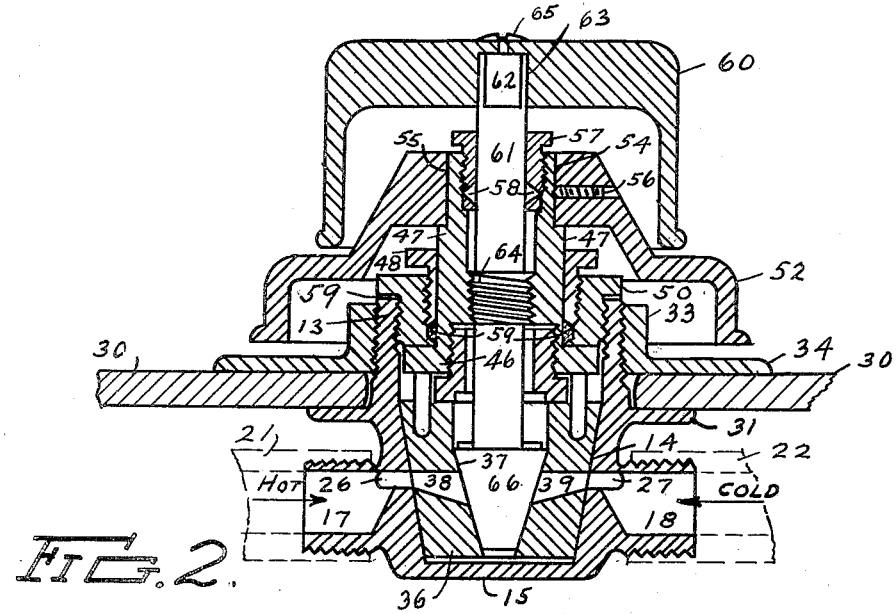
Figure 2 is a sectional view taken along line 2—2 of Figure 1, and shows the position of the plug in relation to the hot and cold water inlets and shows the valve head in closed position.
Figure 3:
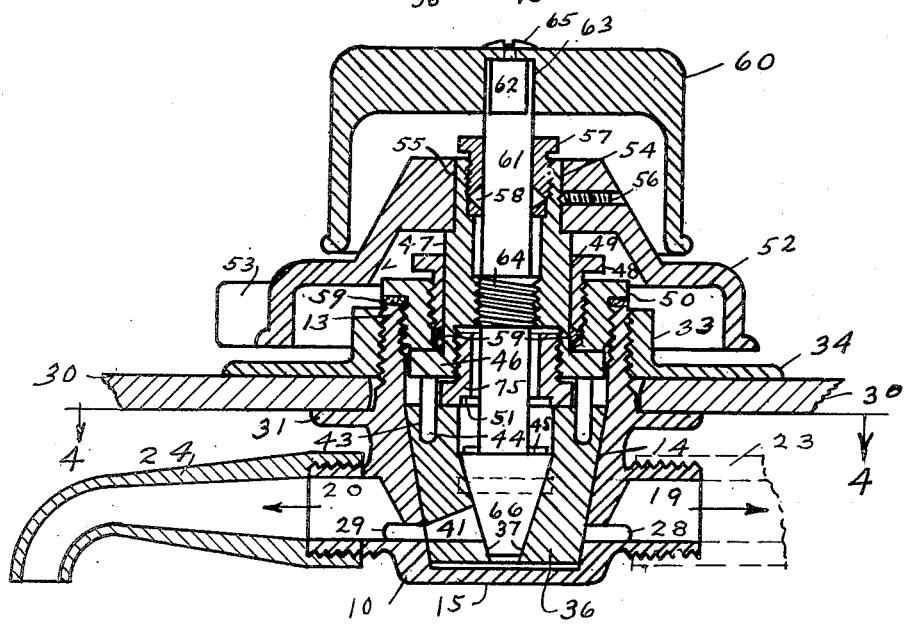
Figure 3 is a sectional view taken along line 3—3 of Figure 1, but with the view taken at right angles to that shown in Figure 2, and shows the plug positioned to allow the water to run out of the spout when the valve head is opened, the passage to the shower bath being in off position.

A main dome like handle 60 is employed for turning the unit on and off. This is done through its attachment to a valve stem 61 extending vertically in Figures 2 and 3 of the drawings. The upper end portion 62 is of irregular form to fit into a similarly formed recess 63 in the dome 60. This enables the dome to rotate the stem as it rotates. A screw threaded middle portion 64 on the stem engages in the spindle 47 so that its rotations will raise and lower the valve cone head 66. A screw 65 keeps the dome on the end of the stem. At the opposite end of the stem, a tapered valve cone head 66 aligns and wedges into the tapered seat 37 formed in the plug 36. This valve head is raised or lowered from the seat 37 as it is operated by the stem and turns the water on or off according to the position of the valve head 66. This is because the plug walls and the valve head obstruct any passage of water through the unit. However assuming the valve stem and head is turned to a mixing position it will allow water from the hot and cold piping 21 and 22 to pass through the slots 26 and 27 thence through passages 38 and 39 and mix together, when the valve head 66 is raised and will flow together through the spigot spout 24 into the basin or bath. If the cap 52 and indicating arm 53 is then rotated 180 degrees it will cut off the flow to the spigot and divert it through the groove 41 in the plug head to the shower piping. The temperature of the water mixed is determined by the position of plug 36 and its passages 38 and 39 in relation to the passages 26 and 27 in the hot and cold water inlets. The amount the valve stem and head is raised will govern the amount of water released through outlet. A further rotation will close off the cold water and permit the hot water to flow through. Other variations will permit the mixture of hot and cold water to be adjusted to any desirable temperature that the user deems suitable. The lower end of the valve stem 61 where it joins the valve head 66 is provided with a key 45 which fits into a slot 51 in a spacer collar 75 which is screwed into the lower part of the lock spindle 47 and is adjusted up or down against the upper face of the plug to keep the tapered parts of the plug and body properly adjusted. To do this, the thread 64 is disengaged from 47, and collar 75 is turned by engaging slot 51 and key 45.

The dome 60 is an inverted bell-shaped cover for the cap 52 and acts as a handle to rotate volume control. It is smaller in diameter to allow the operator to operate it by itself and when necessary to straddle over it with the fingers of his hand to manipulate the cap 52. The cap is set to furnish water of a suitable temperature, and is left alone, while the dome is manipulated to allow the predetermined volume of water to pass through the unit. The arm 53 can be used to rotate the cap or the user may simply grasp its periphery with his fingers. The water may be mixed or used straight hot or cold and allowed to pass to either the spout or the shower independently, as may be required. The turning of the cap operates the spindle 47 which in turn induces its pins 44 inserted in the recesses 43 to turn the plug 36. This in turn rotates the valve head 66 in unison with the plug 36, so the volume of discharge does not vary and changes the position of the plug and its passages with the various passages to or from the outlets or inlets into or away from the body member 10.

The device is relatively easy to operate and its parts are of such form and position as to permit their facile inspection for repairs or adjustment.

The shut-off is positive because the valve head 66 not only seats firmly in seat 37 but also seats plug 36 firmly into the tapered section 14 of housing 10 when screwed down to the "off" position. Also in the "off" position the hot and cold water passages are sealed off from one and another, hence there is no chance of siphoning of water from one system to another due to a difference in pressure. Therefore no check valves are required in conjunction with, or as a part of this faucet. Also due to the special construction wherein the tapered plug floats in the housing instead of being constantly turned under great mechanical or spring pressure, there is much less wear than in the conventional plug type of faucet. The only time it is forceably seated in the faucet housing is when the water is completely shut off through the screwing of valve head 66 firmly into its seat which in turn seats the plug firmly in the housing. The plug is not rotated to do this. It is only rotated after the pressure is released by opening the faucet and allowing the water to flow. When the head is raised and the water is flowing, the temperature control plug can be rotated to any desired position easily and freely.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A mixing faucet unit comprising in combination, a body member provided with threaded portions at its upper end and a tapered lower portion having a collar near its upper end for supporting said body, said body member having plural orifices therein, a hollow plug member having holes in its upper face, and having tapered inner and outer walls for insertion in said tapered lower portion of said body and a mixing chamber therein said hollow plug member having orifices therethrough at predetermined positions and elevations for aligning with the orifices in said body member at predetermined locations, a valve head having a key on its upper face and positioned in the inner portion of said hollow plug for controlling the flow of fluids therethrough, a clamp plate attached to the upper outer portion of said body member to cooperate with said collar, a hollow spindle having a flanged lower portion and a threaded inner portion, said flange of said spindle being provided with pins for contacting and rotating said hollow plug member, a flanged nut attached to the upper inner portion of said body member stuffing material positioned in said nut, a packing nut for insertion in said flanged nut and contacting the stuffing material and centralizing the spindle in said body member, a cap member attached to said spindle for rotating it and the hollow plug member, a stem with screw threads formed at its middle portion and having a valve head at its lower end, a handle connected to the other end of said stem for controlling the flow of liquids through the outlets, and a spacer collar having a key way in its lower face attached in said spindle, the key way being contacted by the key on the valve head to rotate the collar, and for regulating the hollow plug in said body member to take up wear.

2. A mixing faucet unit comprising in combination, a body member provided with threaded portions at its upper end and a tapered lower portion having a collar near its upper end for supporting said body, said body member having plural orifices therein, a hollow plug member having holes in its upper face and having tapered inner and outer walls for insertion in said tapered lower portion of said body and a mixing chamber therein said hollow plug member having orifices therethrough at predetermined positions and elevations for aligning with the orifices in said body member at predetermined locations, a valve head having a key on its upper face and positioned in the inner portion of said hollow plug for controlling the flow of fluids therethrough, and providing a complete shut off for the faucet when the valve head is tightly positioned in the hollow plug member forcing same against the tapered lower part of said body member, a clamp plate attached to the upper outer portion of said body member to cooperate with said collar, a hollow spindle having a flanged lower portion and a threaded inner portion, said flange of the spindle being provided with pins for contacting and rotating said hollow plug member, a flanged nut attached to the upper inner portion of said body member, stuffing material positioned in a packing nut for insertion in said flanged nut and contacting the stuffing material and centralizing the spindle in said body member, a cap member attached to said spindle for rotating it and the hollow plug member, a stem with screw threads formed at its middle portion and having a valve head at its lower end, a handle connected to the other end of said stem for controlling the flow of liquids through the outlets, and a spacer collar having a key way in its lower face attached in said spindle, the key way being contacted by the key on the valve head to rotate the collar, and for regulating the hollow plug in said body member to take up wear.

CHARLES KEPLER BROWN, Jr.

REFERENCES CITED

The following references are of record in the file of this patent:

UNITED STATES PATENTS

| Number | Name | Date |
|---|---|---|
| 1,517,990 | Kinkle | Dec. 2, 1924 |

FOREIGN PATENTS

| Number | Country | Date |
|---|---|---|
| 443,663 | Great Britain | of 1936 |